(12) United States Patent
Xue et al.

(10) Patent No.: US 11,165,523 B2
(45) Date of Patent: Nov. 2, 2021

(54) METHOD AND APPARATUS FOR TESTING ADVANCED ANTENNA SYSTEMS (AAS)

(71) Applicant: Telefonaktiebolaget LM Ericsson (publ), Stockholm (SE)

(72) Inventors: Guoqiang Xue, Kanata (CA); Bengt Strom, Bromma (SE)

(73) Assignee: TELFONAKTIEBOLAGET LM ERICSSON (PUBL), Stockholm (SE)

( * ) Notice: Subject to any disclaimer, the term of this patent is extended or adjusted under 35 U.S.C. 154(b) by 17 days.

(21) Appl. No.: 16/755,723

(22) PCT Filed: Dec. 26, 2017

(86) PCT No.: PCT/IB2017/058404
§ 371 (c)(1),
(2) Date: Apr. 13, 2020

(87) PCT Pub. No.: WO2019/086945
PCT Pub. Date: May 9, 2019

(65) Prior Publication Data
US 2021/0203425 A1 Jul. 1, 2021

Related U.S. Application Data

(60) Provisional application No. 62/580,213, filed on Nov. 1, 2017.

(51) Int. Cl.
*H04B 17/00* (2015.01)
*H04B 17/391* (2015.01)

(52) U.S. Cl.
CPC ..... *H04B 17/3912* (2015.01); *H04B 17/0085* (2013.01); *H04B 17/0087* (2013.01)

(58) Field of Classification Search
CPC .................................................. H04B 17/39
See application file for complete search history.

(56) References Cited

U.S. PATENT DOCUMENTS

2017/0019154 A1   1/2017   Reed
2021/0175621 A1*  6/2021   West ................. H01Q 3/28

FOREIGN PATENT DOCUMENTS

EP    3 182 619 A1   6/2017
WO    2017/091713 A1  6/2017

OTHER PUBLICATIONS

International Search Report and Written Opinion dated Nov. 7, 2018 issued in PCT Application No. PCT/IB2017/058404, consisting of 11 pages.

* cited by examiner

*Primary Examiner* — Sulaiman Nooristany
(74) *Attorney, Agent, or Firm* — Christopher & Weisberg, P.A.

(57) ABSTRACT

A system for emulating a plurality of wireless communication channels is provided. The system includes a plurality of elevation steering devices configured to modify at least one elevation characteristic of a plurality of signals and a plurality of combiners. Each combiner is configured to combine at least two signals of the plurality of signals to output a combined signal. The plurality of combiners output a plurality of combined signals. The system includes a plurality of azimuth steering devices configured to modify at least one azimuth characteristic of the plurality of combined signals. The plurality of elevation steering devices and the plurality of azimuth steering devices emulate the plurality of wireless communication channels.

18 Claims, 7 Drawing Sheets

METHOD AND APPARATUS FOR TESTING ADVANCED ANTENNA SYSTEMS (AAS)

CROSS-REFERENCE TO RELATED APPLICATIONS

This application is a Submission Under 35 U.S.C. § 371 for U.S. National Stage Patent Application of International Application No.: PCT/IB2017/058404, filed Dec. 26, 2017 entitled "METHOD AND APPARATUS FOR TESTING ADVANCED ANTENNA SYSTEMS (AAS)," which claims priority to U.S. Provisional Application No. 62/580,213, filed Nov. 1, 2017, entitled "METHOD AND APPARATUS FOR TESTING ADVANCED ANTENNA SYSTEMS (AAS)," the entireties of both of which are incorporated herein by reference.

TECHNICAL FIELD

This disclosure relates to wireless communications and in particular to a method and system for testing an Advanced Antenna System.

BACKGROUND

The demand for high capacity in wireless communications has seen the industry pursuing advanced technologies such beamforming and Advanced Antenna Systems (AAS).

Beamforming is a technology that improves cell coverage and capacity by using multiple antennas to transmit the same signal. Beamforming also provides communication reliability. Commercial Long Term Evolution (LTE) products that use eight antenna/radio ports for azimuth plane beamforming are readily available.

AAS further pushes the boundary of beamforming by employing numerous amounts of antenna elements to enable beamforming in both the azimuth plane and the elevation plane. Employing these numerous amounts of antenna elements also improves beamforming gain that not only enhances network coverage but also reduces inter-cell interference. Further, high gain offered by massive multiple input multiple output (MIMO) also makes it feasible to use extremely high frequency (mmWave) for cellular communications.

However, the use of numerous amounts of antenna elements discussed above presents various challenges when it comes to testing the AAS products. To better understand these challenges, various testing methods along with their pros and cons are listed below:

1. Over-the-air testing: in this first testing approach, the AAS product transmits a signal into the air. Measurements are performed on the signal received from the over-the-air transmission. Pros: least costly method among the three approaches discussed in this section. Cons: very difficult to troubleshoot when the beamforming function does not work.
2. Chamber testing: in this second testing approach, an antenna radiation pattern is measured in an anechoic chamber. Pros: beamforming functionality can be tested, and troubleshooting beamforming functionality is also possible. Cons: expensive and limited test coverage (difficult to introduce a time variant fading channel); chamber takes lots of space; and difficult to test network performance (e.g., coverage, cell boundary performance).
3. Lab testing using a channel emulator: if the antenna panel can be detached from the AAS radio, it is possible to perform testing by connecting the AAS radio to a (or multiple) channel emulator(s). Pros: can perform very extensive testing using channel models provided by the channel emulator. Cons: can be very expensive, especially when number of radio ports exceeds number of available ports on the channel emulator. For example, in the case that the AAS radio has more ports can a single channel emulator, multiple channel emulators are required.

SUMMARY

Some embodiments advantageously provide a method and system for testing an Advanced Antenna System (AAS).

This disclosure at least in part solves one or more issues encountered in the third approach (i.e., Lab Testing approach described above), namely, using a channel emulator to test an AAS product where the channel emulator has less ports than the AAS radio.

One or more methods are described herein concatenate AAS radio ports such that a minimum number of ports of a channel emulator can be used for testing. The concatenation scheme described herein takes advantage of the knowledge of antenna geometry. In one or more embodiments, elevation is emulated outside of the channel emulator while azimuth is emulated by the channel emulator.

One embodiment of the disclosure provides a system for emulating a plurality of wireless communication channels. A plurality of elevation steering devices are configured to modify at least one elevation characteristic of a plurality of signals. A plurality of combiners are included in which each combiner is configured to combine at least two signals of the plurality of signals to output a combined signal. The plurality of combiners output a plurality of combined signals. A plurality of azimuth steering devices are configured to modify at least one azimuth characteristic of the plurality of combined signals. The plurality of elevation steering devices and the plurality of azimuth steering devices emulate the plurality of wireless communication channels.

In accordance with one aspect of this embodiment, the plurality of elevation steering devices are configured to manipulate at least one taken from a group of phase, amplitude and time delay. In accordance with another aspect of this embodiment, the plurality of azimuth steering devices are different from the plurality of elevation steering devices. In accordance with still another aspect of this embodiment, the plurality of elevation steering devices apply a weighting vector [c1, c2, . . . cN] to the plurality of signals, where N corresponds to a number of the plurality of elevation steering devices. In accordance with yet another aspect of this embodiment, the plurality of azimuth steering devices manipulate phase, amplitude and time delay of the plurality of signals [g1, g2, . . . , gX], where X corresponds to a number of the plurality of elevation steering devices. In accordance with another aspect of this embodiment, each combiner is a4 to 1 combiner.

In accordance with another embodiment, the disclosure provides a method for emulating a plurality of wireless communication channels. At least one elevation characteristic of a plurality of signals is modified using a plurality of elevation steering devices. The plurality of signals are combined to output a plurality of combined signal using a plurality of combiners. Each combiner is configured to combine at least two signals of the plurality of signals. At least one azimuth characteristic of the plurality of combined signals is modified using a plurality of azimuth steering devices. The plurality of elevation steering devices and the plurality of azimuth steering devices emulate the plurality of wireless communication channels.

Yet another embodiment of the disclosure provides a system for emulating a plurality of wireless communication channels. The system includes a radio frequency (RF) apparatus comprising a plurality of elevation steering devices configured to modify at least one elevation characteristic of a plurality of signals, a plurality of combiners, each combiner configured to combine at least two signals of the plurality of signals to output a combined signal, the plurality of combiners outputting a plurality of combined signals. The system also includes a channel emulator. The channel emulator comprises a plurality of azimuth steering devices configured to modify at least one azimuth characteristic of the plurality of combined signals. The plurality of elevation steering devices and the plurality of azimuth steering devices emulate the plurality of wireless communication channels.

Another embodiment of the disclosure provides a radio frequency (RF) apparatus for emulating a plurality of wireless communication channels. The RF apparatus comprises a plurality of elevation steering devices configured to modify at least one elevation characteristic of a plurality of signals, a plurality of combiners in which each combiner is configured to combine at least two signals of the plurality of signals to output a combined signal, the plurality of combiners outputting a plurality of combined signals, a plurality of azimuth steering devices configured to modify at least one azimuth characteristic of the plurality of combined signals. The plurality of elevation steering devices and the plurality of azimuth steering devices emulating the plurality of wireless communication channels.

In accordance with still another embodiment, the disclosure provides a system for emulating a plurality of wireless communication channels. The system includes a radio frequency (RF) apparatus and a channel emulator. The RF apparatus comprises an elevation modification module configured to modify at least one elevation characteristic of a plurality of signals and a combining module configured to combining the plurality of signals to output a plurality of combined signal. The channel emulator is in communication with the RF apparatus. The channel emulator includes an azimuth modification module configured to modify at least one azimuth characteristic of the plurality of combined signals. The elevation modification module and the azimuth modification module emulate the plurality of wireless communication channels.

Another embodiment of the disclosure provides a system for emulating a plurality of wireless communication channels. The system comprises a radio frequency (RF) apparatus and an azimuth modification module. The RF apparatus includes an elevation modification module configured to modify at least one elevation characteristic of a plurality of signals and a combining module configured to combine the plurality of signals to output a plurality of combined signal. An azimuth modification module is configured to modify at least one azimuth characteristic of the plurality of combined signals. The elevation modification module and the azimuth modification module emulate the plurality of wireless communication channels.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
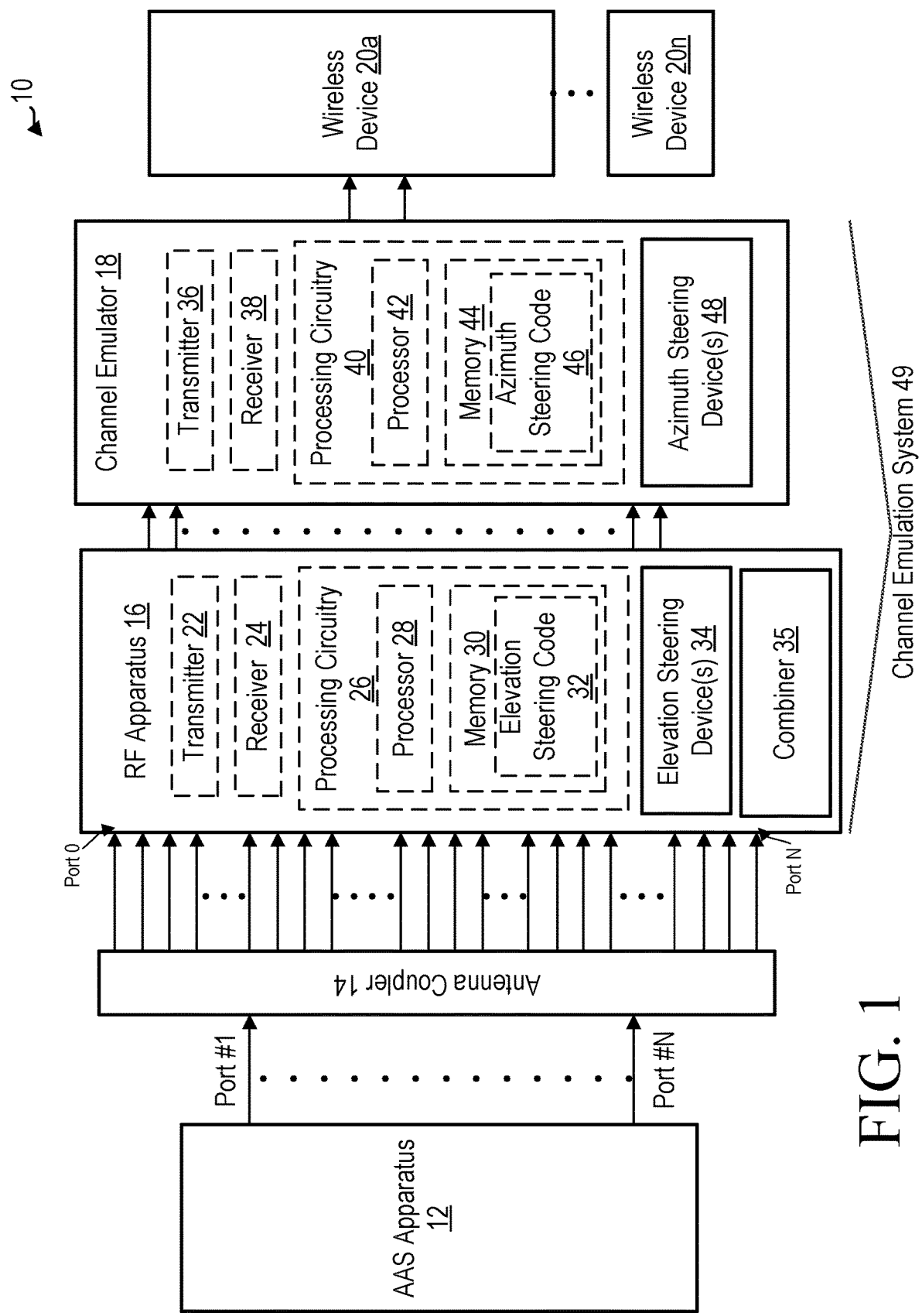
FIG. 1 is a block diagram of an example system for testing advanced antenna system (AAS) in accordance with the principles of the disclosure.

The arrangement described herein significantly lowers the number of ports of the channel emulator that are needed for testing as compared with known approaches. The arrangement also advantageously allows for testing of functionality and performance of both azimuth beamforming and elevation beamforming.

Before describing in detail exemplary embodiments, it is noted that the embodiments reside primarily in combinations of components and processing steps related to methods and apparatuses. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring now to drawing figures in which like reference designators refer to like elements there is shown in FIG. 1 is a block diagram of an example system for testing advanced antenna system (AAS) apparatuses in accordance with the principles of the disclosure, where the system is generally referred to as system "10." System 10 includes an AAS apparatus 12 as is known in the art. In one or more embodiments, AAS apparatus 12 includes a digital unit and an AAS radio having N ports. For example, in one embodiment, the AAS radio includes 64 ports. System 10 includes antenna coupler 14 that is configured to couple AAS apparatus 12 to RF apparatus 16. Antenna coupler 14 couples the ports of AAS apparatus 12 to the input ports of RF apparatus 16.

RF apparatus 16 includes transmitter 22 and receiver 24 for communicating with AAS apparatus 12, antenna coupler 14, channel emulator and/or other entities in system 10. In one or more embodiments, transmitter 22 and/or receiver 24 include and/or is/are replaced by one or more communication interfaces. RF apparatus 16 includes processing circuitry 26. Processing circuitry 26 includes processor 28 and memory 30. In addition to a traditional processor and memory, processing circuitry 26 may comprise integrated circuitry for processing and/or control, e.g., one or more processors and/or processor cores and/or FPGAs (Field Programmable Gate Array) and/or ASICs (Application Specific Integrated Circuitry). Processor 28 may be configured to access (e.g., write to and/or reading from) memory 30, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 30 may be configured to store code executable by processor 28 and/or other data, e.g., data pertaining to phase shifting, etc.

Processing circuitry 26 may be configured to control any of the methods and/or processes described herein and/or to cause such methods, and/or processes to be performed, e.g., by RF apparatus 16. Processor 28 may include one or more processors 28 for performing RF apparatus 16 functions described herein. RF apparatus 16 includes memory 30 that is configured to store data, programmatic software code and/or other information described herein. In one or more embodiments, memory 30 is configured to store elevation steering code 32. For example, elevation steering code 32 includes instructions that, when executed by processor 28, causes processor 28 to perform the functions described herein.

RF apparatus 16 includes one or more elevation steering devices 34 that are configured to modify at least one elevation characteristic of a plurality of signals input from antenna coupler 14. In one or more embodiments, elevation steering device 34 is a phase shifter. In one or more embodiments, the value or configuration of the phase shifter is controlled by processing circuitry 26. In one or more embodiments, elevation steering device 34 is another electrical, mechanical and/or electro-mechanical component that is capable of shifting the phase of a signal. In one or more embodiments, one or more of elements 22-32 may be omitted based on design choice such that elevation steering devices 34 are controlled by another entity in system 10. RF apparatus 16 includes one or more combiners 35 for inputting a plurality of signals and outputting a combined signal. For example, in one or more embodiments, combiner 35 is a 4 to 1 combiner. Combiner 35 advantageously concatenates or combines at least two signals.

System 10 includes channel emulator 18. Channel emulator 18 includes transmitter 36 and receiver 38 for communicating with RF apparatus 16 and wireless device 20 and/or other entities in system 10. In one or more embodiments, transmitter 36 and/or receiver 38 include and/or is/are replaced by one or more communication interfaces. Channel emulator 18 includes processing circuitry 40. Processing circuitry 40 includes processor 42 and memory 44. In addition to a traditional processor and memory, processing circuitry 40 may comprise integrated circuitry for processing and/or control, e.g., one or more processors and/or processor cores and/or
FPGAs (Field Programmable Gate Array) and/or ASICs (Application Specific Integrated Circuitry). Processor 42 may be configured to access (e.g., write to and/or reading from) memory 44, which may include any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 44 may be configured to store code executable by processor 42 and/or other data, e.g., data pertaining to phase shifting, etc.

Processing circuitry 40 may be configured to control any of the methods and/or processes described herein and/or to cause such methods, and/or processes to be performed, e.g., by channel emulator. Processor 42 corresponds to one or more processors 42 for performing channel emulator 18 functions described herein. Channel emulator 18 includes memory 44 that is configured to store data, programmatic software code and/or other information described herein. In one or more embodiments, memory 44 is configured to store azimuth steering code 46. For example, azimuth steering code 46 includes instructions that, when executed by processor 42, causes processor 42 to perform the functions described herein.

Channel emulator 18 includes one or more azimuth steering devices 48 that are configured to modify at least one azimuth characteristic of a plurality of signals, i.e., combined signals, input from RF apparatus 16. In one or more embodiments, one or more azimuth steering devices 48 are configured to manipulate one or more of phase, amplitude and time delay. In one or more embodiments, azimuth steering devices 48 include one or more of a phase shifter, amplitude manipulator and/or time delay manipulator. In one or more embodiments, the value(s) or configuration of the phase shifter, amplitude manipulator and/or time delay manipulator are controlled by processing circuitry 40. In one or more embodiments, azimuth steering device 48 is another electrical, mechanical and/or electro-mechanical component that is capable of manipulating at least one azimuth characteristic such as phase, amplitude and time delay of a plurality of signals. In one or more embodiments, one or more of elements 36-46 may be omitted based on design choice such that azimuth steering devices 48 are controlled by another entity in system 10.

In one or more embodiments, RF apparatus 16 and channel emulator 18 form channel simulation (or emulation) system 49 that is configured to provide elevation steering and azimuth steering using different components such as to advantageously allow AAS radio ports of AAS apparatus 12 to be concatenated such that a minimum number of channel emulators are able to be used for testing AAS apparatus 12. For example, 64 AAS radio ports are concatenated to 16 ports using several 4 to 1 combiners such that one channel emulator 18 with 16 ports is able to be used, as described herein.

System 10 includes one or more wireless devices 20a-20n as are known in the art. The term wireless device such as "wireless device 20" as used herein may be a radio communication device, wireless device endpoint, mobile endpoint, device endpoint, sensor device, target device, device-to-device wireless device, user equipment (UE), machine type wireless device or wireless device capable of machine to machine communication, a sensor equipped with wireless device, tablet, mobile terminal, mobile telephone, laptop, computer, appliance, automobile, smart phone, laptop embedded equipped (LEE), laptop mounted equipment (LME), USB dongle and customer premises equipment (CPE), among other devices that can communicate radio or wireless signals as are known in the art.

Figure 2:
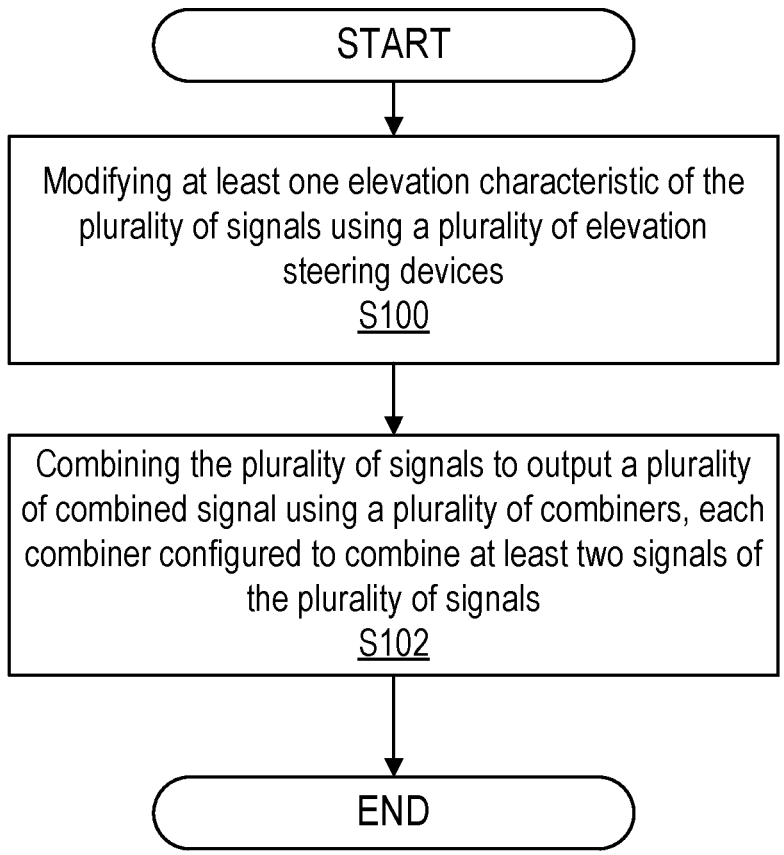
FIG. 2 is a flow diagram of an exemplary elevation steering process of elevation steering code 32 in accordance with the principles of the disclosure.

FIG. 2 is a flow diagram of an exemplary elevation steering process of elevation steering code 32 in accordance with the principles of the disclosure. Processing circuitry 26 is configured to modify at least one elevation characteristic of the plurality of signals using a plurality of elevation steering devices 34, as described herein (Block S100). Processing circuitry 26 is configured to combine the plurality of signals to output a plurality of combined signals using a plurality of combiners 35, as described herein (Block S102). In one or more embodiments, each combiner 35 is configured to combine at least two signals of the plurality of signals that have been modified by elevation steering devices 34.

Figure 3:
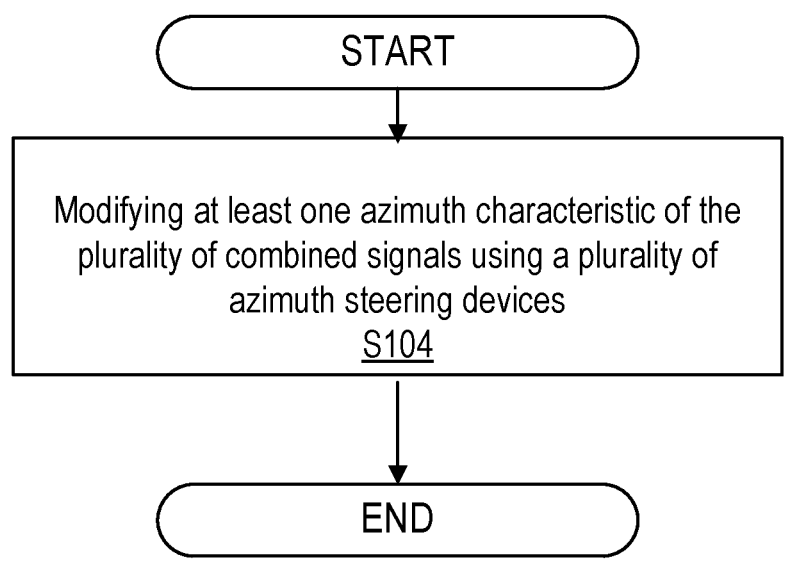
FIG. 3 is a flow diagram of an exemplary azimuth steering process of azimuth steering code 46 in accordance with the principles of the disclosure.

FIG. 3 is a flow diagram of an exemplary azimuth steering process of azimuth steering code 46 in accordance with the principles of the disclosure. Processing circuitry 40 is configured to modify at least one azimuth characteristic of the plurality of combined signals using a plurality of azimuth steering devices 48, as described herein (Block S104).

Figure 4:
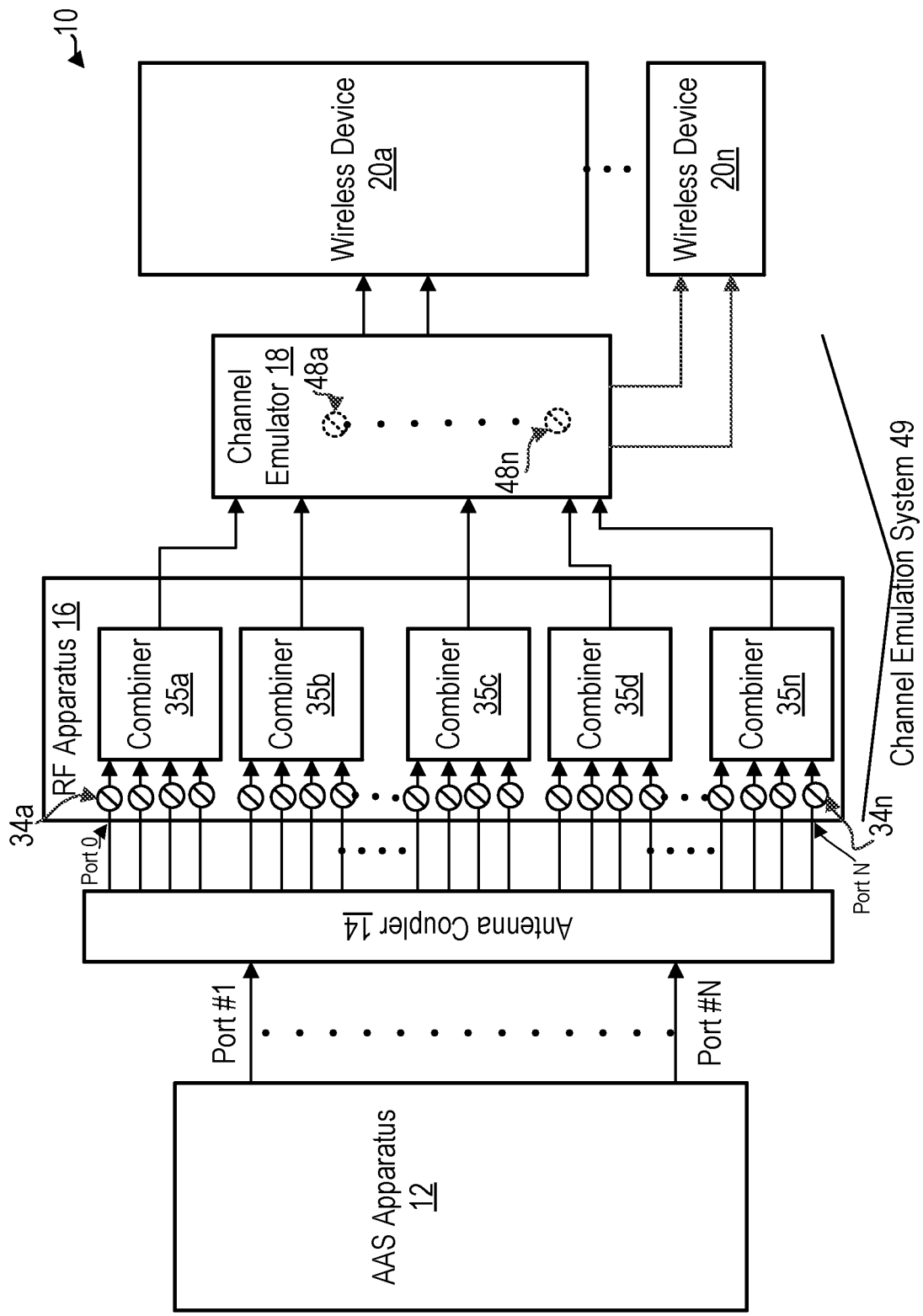
FIG. 4 is a block diagram of another embodiment of system in accordance with the principles of the disclosure.

FIG. 4 is a block diagram of another embodiment of system 10 in accordance with the principles of the disclosure. Elevation steering device 34 are configured to manipulate one or more of phase, amplitude and time delay. In one or more embodiments, elevation steering devices 34 includes one or more of a phase shifter, amplitude manipulator and/or time delay manipulator that communicate signals from input port of RF apparatus 16 to combiner 35. In the embodiment of RF apparatus 16 illustrated in FIG. 4, elevation steering device 34 is configured to phase shift, manipulate amplitude and/or time delay an input signal and communicate the altered or manipulated signal to a 4 to 1 combiner 35. There are N signals which correspond to N ports of AAS apparatus 12. In this embodiment, azimuth steering devices 48 of channel emulator 18 are phase shifters, amplitude manipulators and/or time delay manipulators that are configured to alter or modify one or more combined signals received from combiner 35 where the number of azimuth steering devices 48 is less than the number of elevation steering devices 34. In one embodiment with AAS apparatus 12 having 64 ports and where RF apparatus 16 uses 4 to 1 combiners 35, 64 elevation steering devices 34 are used while 16 azimuth steering devices 48 are used. This embodiment of RF apparatus 16 and channel emulator 18 are discussed in detail below.

Figure 5:
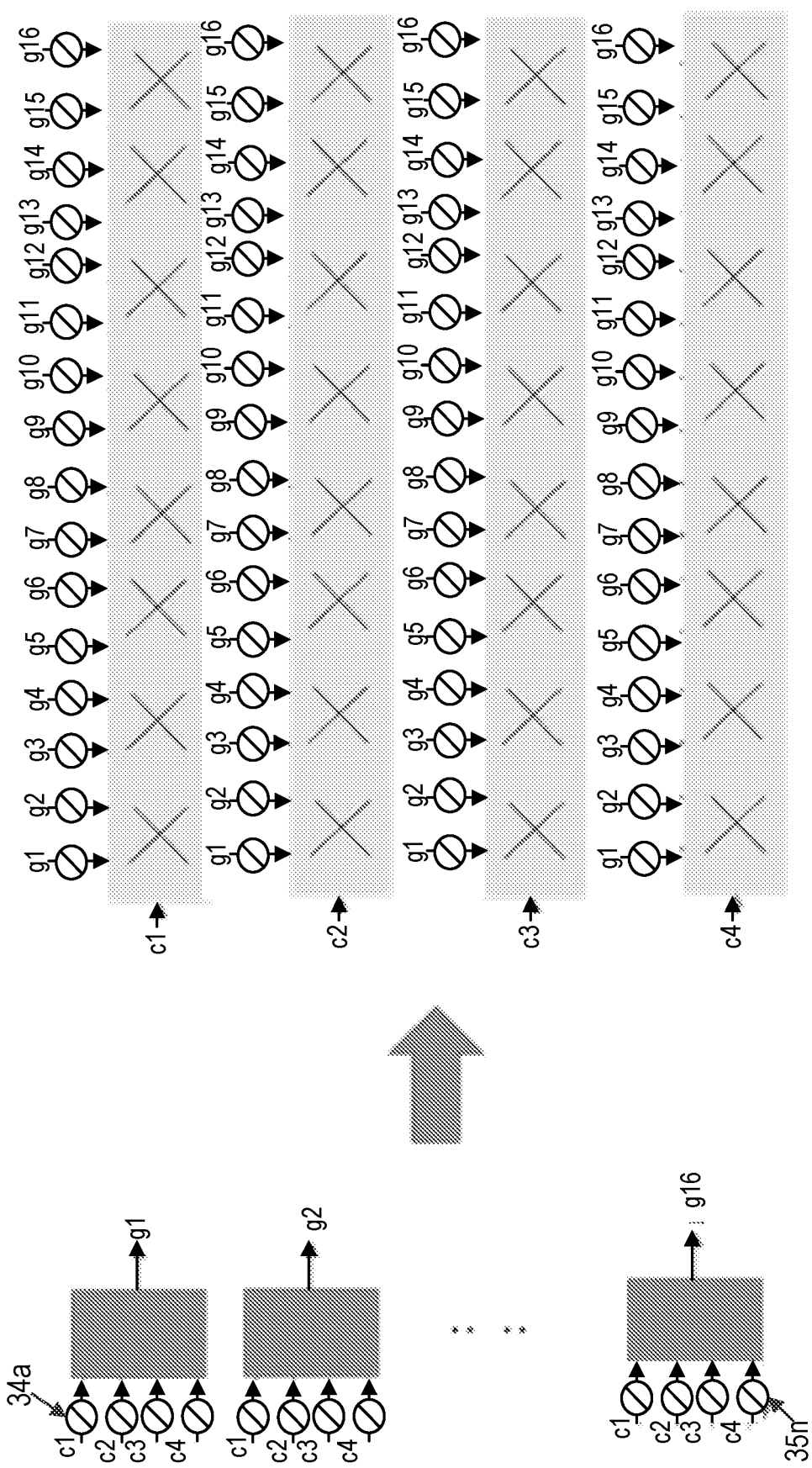
FIG. 5 is a block diagram of elevation steering devices and azimuth steering devices illustrated in FIG. 4 in accordance with the principles of the disclosure.

FIG. 5 is a block diagram of elevation steering devices 34 and azimuth steering devices 48 illustrated in FIG. 4 in accordance with the principles of the disclosure. In particular, in the left side of FIG. 5, combiner 35 is a 4 to 1 combiner.

The incoming signals to each combiner 35 are weighted by a weighting vector [c1, c2, c3, c4]. The right-hand side of FIG. 5 depicts how the weighting factor [c1, c2, c3, c4] and the outputs/output signals of the RF apparatus 16 [g1, g2, . . . g16], i.e., plurality of signals, are applied to the antenna array denoted by "Xs". Outputs [g1, g2, . . . g16] are connected to channel emulator 18. Channel emulator 18 will manipulate [g1, g2, . . . g16] to emulate channel geometry and fading. Using this arrangement, elevation steering is controlled by elevation steering devices 34, [c1, c2, . . . c4] which reside in the RF apparatus 16, while as azimuth steering is controlled by channel emulator 18 such as via azimuth steering devices 48. In one or more embodiments, respective steering corresponds to altering/manipulating at least one of phase, amplitude and time delay.

Figure 6:
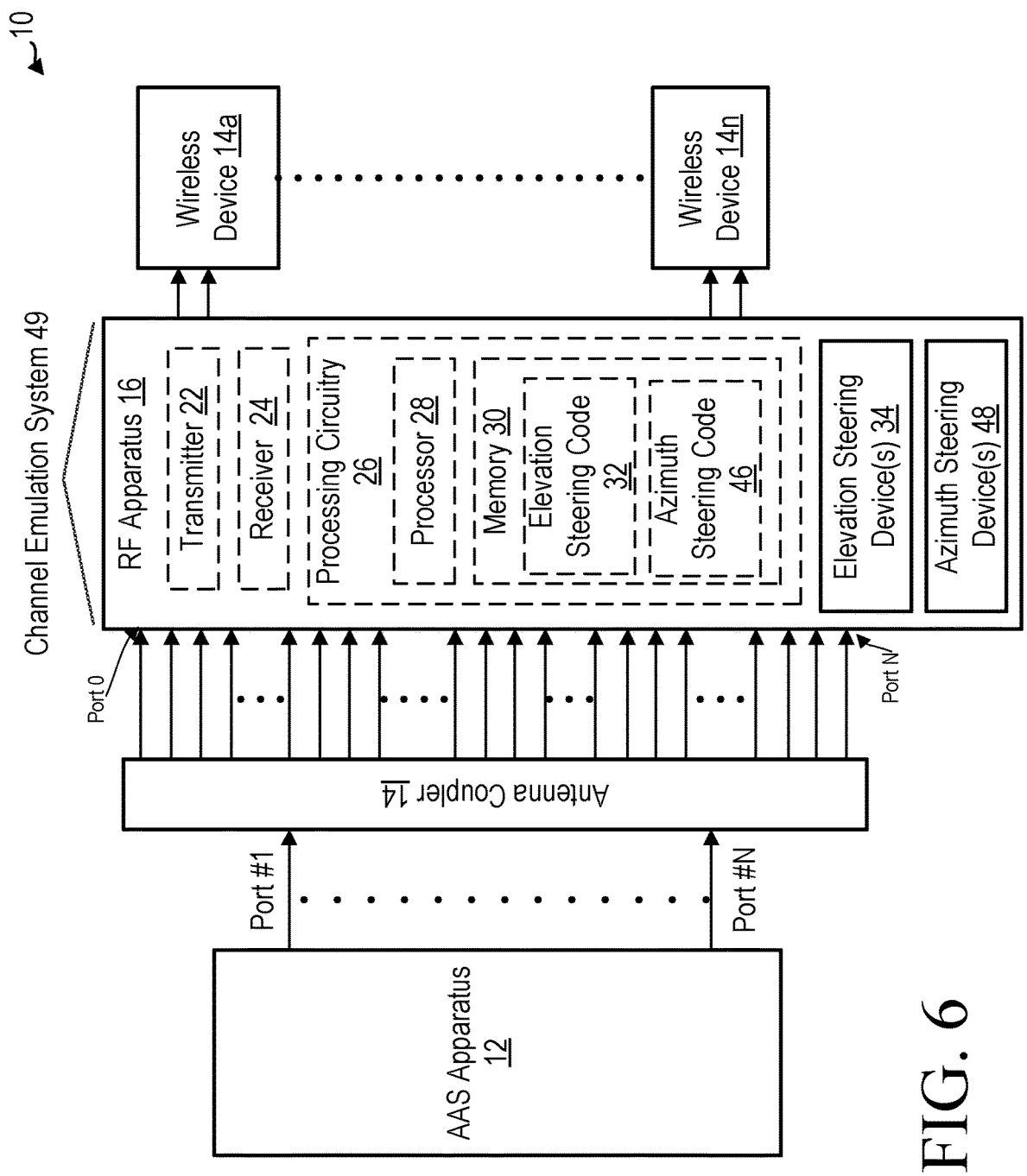
FIG. 6 is a block diagram of another embodiment of the system in accordance with the principles of the disclosure.

FIG. 6 is a block diagram of another embodiment of system 10 in accordance with the principles of the disclosure. In particular, RF apparatus 16 is configured to perform both the elevation steering process and the azimuth steering process described herein. Further, in one or more embodiments, elevation steering devices 34 are one or more of phase shifters, amplitude manipulators and/or time delay manipulators, as illustrated in FIG. 4, that receive a signal associated with a respective port of AAS apparatus 12.

Figure 7:
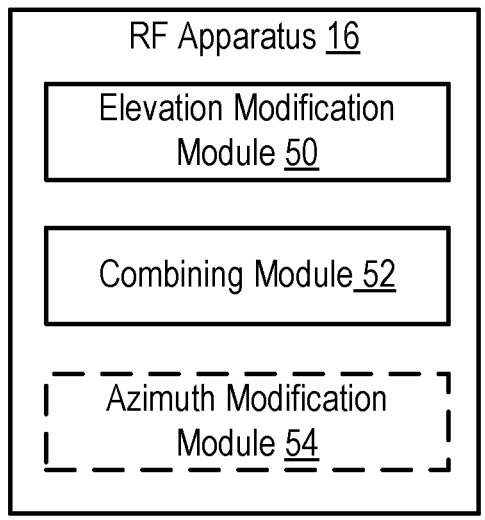
FIG. 7 is another embodiment of an RF apparatus in accordance with the principles of the disclosure.

FIG. 7 is another embodiment of RF apparatus 16 in accordance with the principles of the disclosure. RF apparatus 16 includes elevation modification module 50 that is configured to modify at least one elevation characteristic of the plurality of signals using a plurality of elevation steering devices 34, as described herein. RF apparatus 16 includes combining module 52 that is configured to combine the plurality of signals in order to output a plurality of combined signal using a plurality of combiners 35, as described herein. In one or more embodiments, each combiner 35 is configured to combine at least two signals of the plurality of signals. RF apparatus 16 includes azimuth modification module 54 that is configured to modify at least one azimuth characteristic of the plurality of combined signals using a plurality of azimuth steering devices 48, as described herein. In one or more embodiments, azimuth modification module 54 is omitted from RF apparatus 16 such as if the azimuth modification process is performed by channel emulator 18.

Figure 8:
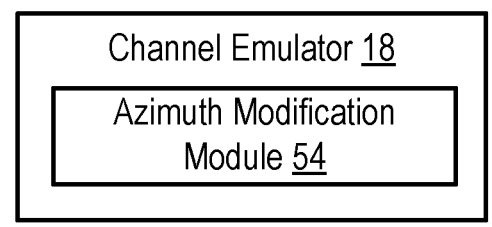
FIG. 8 is another embodiment of a channel emulator in accordance with the principles of the disclosure.

FIG. 8 is another embodiment of channel emulator 18 in accordance with the principles of the disclosure. Channel emulator 18 includes azimuth modification module 54 that is configured to modify at least one azimuth characteristic of the plurality of combined signals using a plurality of azimuth steering devices 48, as described herein.

According to one aspect of the disclosure, a system 49 for simulating (or emulating) a plurality of wireless communication channels is provided. The system 49 includes a plurality of elevation steering devices 34 configured to modify at least one elevation characteristic of a plurality of signals. The system 49 includes a plurality of combiners 35. Each combiner 35 is configured to combine at least two signals of the plurality of signals to output a combined signal. The plurality of combiners 35 output a plurality of combined signals. The system 49 includes a plurality of azimuth steering devices 48 configured to modify at least one azimuth characteristic of the plurality of combined signals. The plurality of elevation steering devices 34 and the plurality of azimuth steering devices 48 simulate the plurality of wireless communication channels.

According to one embodiment of this aspect, the plurality of elevation steering devices 34 are configured to manipulate at least one taken from a group of phase, amplitude and time delay. According to one embodiment of this aspect, the plurality of azimuth steering devices 48 are different from the plurality of elevation steering devices 34.

According to one embodiment of this aspect, the plurality of elevation steering devices 34 apply a weighting vector [c1, c2, . . . cN] to the plurality of signals, where N corresponds to a number of the plurality of elevation steering devices 34. According to one embodiment of this aspect, the plurality of azimuth steering devices 48 manipulate the phase, amplitude and time delay of the plurality of signals [g1, g2, . . . , gX], where X corresponds to a number of the plurality of elevation steering devices 34. According to one embodiment of this aspect, each combiner 35 is a 4 to 1 combiner 35. According to one embodiment of this aspect, the system 49 includes processing circuitry 26/40 configured to: control the plurality of elevation steering devices 34 and control the plurality of azimuth steering devices 48. According to one embodiment of this aspect, the plurality of signals are 64 signals.

According to another aspect of the disclosure, a method for simulating a plurality of wireless communication channels is provided. At least one elevation characteristic of a plurality of signals is modified using a plurality of elevation steering devices 34. The plurality of signals are combined to output a plurality of combined signal using a plurality of combiners 35. Each combiner 35 is configured to combine at least two signals of the plurality of signals. At least one azimuth characteristic of the plurality of combined signals is modified using a plurality of azimuth steering devices 48. The plurality of elevation steering devices 34 and the plurality of azimuth steering devices 48 simulate the plurality of wireless communication channels.

According to one embodiment of this aspect, the plurality of elevation steering devices 34 are configured to manipulate at least one taken from a group of phase, amplitude and time delay. According to one embodiment of this aspect, the plurality of azimuth steering devices 48 are a second plurality of phase shifters different from the plurality of elevation steering devices 34. According to one embodiment of this aspect, the plurality of elevation steering devices 34 apply a weighting vector [c1, c2, . . . cN] to the plurality of signals, where N corresponds to a number of the plurality of elevation steering devices 34.

According to one embodiment of this aspect, the plurality of azimuth steering devices 48 manipulate the phase, amplitude and time delay of the plurality of signals [g1, g2, . . . , gX], where X corresponds to a number of the plurality of elevation steering devices 34. According to one embodiment of this aspect, each combiner is a 4 to 1 combiner 35.

According to one embodiment of this aspect, the plurality of elevation steering devices 34 are controlled. The plurality of azimuth steering devices 48 are controlled. According to one embodiment of this aspect, the plurality of signals are 64 signals.

According to another aspect of the disclosure, a system 49 for simulating (or emulating) a plurality of wireless communication channels is provided. The system 49 includes a radio frequency, RF, apparatus 16, including: a plurality of elevation steering devices 34 configured to modify at least one elevation characteristic of a plurality of signals and a plurality of combiners 35. Each combiner 35 is configured to combine at least two signals of the plurality of signals to output a combined signal. The plurality of combiners output a plurality of combined signals. The system 49 includes a channel emulator 18 including: a plurality of azimuth steering devices 48 configured to modify at least one azimuth characteristic of the plurality of combined signals. The plurality of elevation steering devices 34 and the plurality of azimuth steering devices 48 simulate (or emulate) the plurality of wireless communication channels.

According to another aspect of the disclosure, a radio frequency, RF, apparatus 16 for simulating (or emulating) a plurality of wireless communication channels is provided. The RF apparatus 16 includes a plurality of elevation steering devices 34 configured to modify at least one elevation characteristic of a plurality of signals and a plurality of combiners 35. Each combiner 35 is configured to combine at least two signals of the plurality of signals to output a combined signal. The plurality of combiners 35 outputs a plurality of combined signals. The RF apparatus 16 includes a plurality of azimuth steering devices 48 configured to modify at least one azimuth characteristic of the plurality of combined signals. The plurality of elevation steering devices 34 and the plurality of azimuth steering devices 48 simulate (or emulate) the plurality of wireless communication channels.

According to one aspect of the disclosure, a system 49 for simulating (or emulating) a plurality of wireless communication channels is provided. The system 49 includes a radio frequency, RF, apparatus 16 including: an elevation modification module 50 configured to modify at least one elevation characteristic of a plurality of signals, and a combining module configured to combining the plurality of signals to output a plurality of combined signal. The system 49 includes a channel emulator 18 in communication with the RF apparatus 16, the channel emulator 18 including: an azimuth modification module 54 configured to modify at least one azimuth characteristic of the plurality of combined signals. The elevation modification module 50 and the azimuth modification module 54 simulates (or emulates) the plurality of wireless communication channels.

According to another aspect of the disclosure, a system 49 for simulating (or emulating) a plurality of wireless communication channels is provided. The system 49 includes a radio frequency, RF, apparatus including: elevation modification module 50 configured to modify at least one elevation characteristic of a plurality of signals, combining module 52 configured to combine the plurality of signals to output a plurality of combined signal, and an azimuth modification module 54 configured to modify at least one azimuth characteristic of the plurality of combined signals. The elevation modification module 50 and the azimuth modification module 54 simulate (or emulate) the plurality of wireless communication channels.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings which are limited only by the following claims.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring now to drawing figures in which like reference designators refer to like elements there is shown in FIG. 1 is a block diagram of an example system for testing advanced antenna system (AAS) apparatuses in accordance with the principles of the disclosure, where the system is generally referred to as system "10." System 10 includes an AAS apparatus 12 as is known in the art. In one or more embodiments, AAS apparatus 12 includes a digital unit and an AAS radio having N ports. For example, in one embodiment, the AAS radio includes 64 ports. System 10 includes antenna coupler 14 that is configured to couple AAS apparatus 12 to RF apparatus 16. Antenna coupler 14 couples the ports of AAS apparatus 12 to the input ports of RF apparatus 16.

RF apparatus 16 includes transmitter 22 and receiver 24 for communicating with AAS apparatus 12, antenna coupler 14, channel emulator and/or other entities in system 10. In one or more embodiments, transmitter 22 and/or receiver 24 include and/or is/are replaced by one or more communication interfaces. RF apparatus 16 includes processing circuitry 26. Processing circuitry 26 includes processor 28 and memory 30. In addition to a traditional processor and memory, processing circuitry 26 may comprise integrated circuitry for processing and/or control, e.g., one or more processors and/or processor cores and/or FPGAs (Field Programmable Gate Array) and/or ASICs (Application Specific Integrated Circuitry). Processor 28 may be configured to access (e.g., write to and/or reading from) memory 30, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 30 may be configured to store code executable by processor 28 and/or other data, e.g., data pertaining to phase shifting, etc.

Processing circuitry 26 may be configured to control any of the methods and/or processes described herein and/or to cause such methods, and/or processes to be performed, e.g., by RF apparatus 16. Processor 28 may include one or more processors 28 for performing RF apparatus 16 functions described herein. RF apparatus 16 includes memory 30 that is configured to store data, programmatic software code and/or other information described herein. In one or more embodiments, memory 30 is configured to store elevation steering code 32. For example, elevation steering code 32 includes instructions that, when executed by processor 28, causes processor 28 to perform the functions described herein.

RF apparatus 16 includes one or more elevation steering devices 34 that are configured to modify at least one elevation characteristic of a plurality of signals input from antenna coupler 14. In one or more embodiments, elevation steering device 34 is a phase shifter. In one or more embodiments, the value or configuration of the phase shifter is controlled by processing circuitry 26. In one or more embodiments, elevation steering device 34 is another electrical, mechanical and/or electro-mechanical component that is capable of shifting the phase of a signal. In one or more embodiments, one or more of elements 22-32 may be omitted based on design choice such that elevation steering devices 34 are controlled by another entity in system 10. RF apparatus 16 includes one or more combiners 35 for inputting a plurality of signals and outputting a combined signal. For example, in one or more embodiments, combiner 35 is a 4 to 1 combiner. Combiner 35 advantageously concatenates or combines at least two signals.

System 10 includes channel emulator 18. Channel emulator 18 includes transmitter 36 and receiver 38 for communicating with RF apparatus 16 and wireless device 20 and/or other entities in system 10. In one or more embodiments, transmitter 36 and/or receiver 38 include and/or is/are replaced by one or more communication interfaces. Channel emulator 18 includes processing circuitry 40. Processing circuitry 40 includes processor 42 and memory 44. In addition to a traditional processor and memory, processing circuitry 40 may comprise integrated circuitry for processing and/or control, e.g., one or more processors and/or processor cores and/or FPGAs (Field Programmable Gate Array) and/or ASICs (Application Specific Integrated Circuitry). Processor 42 may be configured to access (e.g., write to and/or reading from) memory 44, which may include any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 44 may be configured to store code executable by processor 42 and/or other data, e.g., data pertaining to phase shifting, etc.

Processing circuitry 40 may be configured to control any of the methods and/or processes described herein and/or to cause such methods, and/or processes to be performed, e.g., by channel emulator. Processor 42 corresponds to one or more processors 42 for performing channel emulator 18 functions described herein. Channel emulator 18 includes memory 44 that is configured to store data, programmatic software code and/or other information described herein. In one or more embodiments, memory 44 is configured to store azimuth steering code 46. For example, azimuth steering code 46 includes instructions that, when executed by processor 42, causes processor 42 to perform the functions described herein.

Channel emulator 18 includes one or more azimuth steering devices 48 that are configured to modify at least one azimuth characteristic of a plurality of signals, i.e., combined signals, input from RF apparatus 16. In one or more embodiments, one or more azimuth steering devices 48 are configured to manipulate one or more of phase, amplitude and time delay. In one or more embodiments, azimuth steering devices 48 include one or more of a phase shifter, amplitude manipulator and/or time delay manipulator. In one or more embodiments, the value(s) or configuration of the phase shifter, amplitude manipulator and/or time delay manipulator are controlled by processing circuitry 40. In one or more embodiments, azimuth steering device 48 is another electrical, mechanical and/or electro-mechanical component that is capable of manipulating at least one azimuth characteristic such as phase, amplitude and time delay of a plurality of signals. In one or more embodiments, one or more of elements 36-46 may be omitted based on design choice such that azimuth steering devices 48 are controlled by another entity in system 10.

In one or more embodiments, RF apparatus 16 and channel emulator 18 form channel simulation (or emulation) system 49 that is configured to provide elevation steering and azimuth steering using different components such as to advantageously allow AAS radio ports of AAS apparatus 12 to be concatenated such that a minimum number of channel emulators are able to be used for testing AAS apparatus 12. For example, 64 AAS radio ports are concatenated to 16 ports using several 4 to 1 combiners such that one channel emulator 18 with 16 ports is able to be used, as described herein.

System 10 includes one or more wireless devices 20a-20n as are known in the art. The term wireless device such as "wireless device 20" as used herein may be a radio communication device, wireless device endpoint, mobile endpoint, device endpoint, sensor device, target device, device-to-device wireless device, user equipment (UE), machine type wireless device or wireless device capable of machine to machine communication, a sensor equipped with wireless device, tablet, mobile terminal, mobile telephone, laptop, computer, appliance, automobile, smart phone, laptop embedded equipped (LEE), laptop mounted equipment (LME), USB dongle and customer premises equipment (CPE), among other devices that can communicate radio or wireless signals as are known in the art.

FIG. 2 is a flow diagram of an exemplary elevation steering process of elevation steering code 32 in accordance with the principles of the disclosure. Processing circuitry 26 is configured to modify at least one elevation characteristic of the plurality of signals using a plurality of elevation steering devices 34, as described herein (Block S100). Processing circuitry 26 is configured to combine the plurality of signals to output a plurality of combined signals using a plurality of combiners 35, as described herein (Block S102). In one or more embodiments, each combiner 35 is configured to combine at least two signals of the plurality of signals that have been modified by elevation steering devices 34.

FIG. 3 is a flow diagram of an exemplary azimuth steering process of azimuth steering code 46 in accordance with the principles of the disclosure. Processing circuitry 40 is configured to modify at least one azimuth characteristic of the plurality of combined signals using a plurality of azimuth steering devices 48, as described herein (Block S104).

FIG. 4 is a block diagram of another embodiment of system 10 in accordance with the principles of the disclosure. Elevation steering device 34 are configured to manipulate one or more of phase, amplitude and time delay. In one or more embodiments, elevation steering devices 34 includes one or more of a phase shifter, amplitude manipulator and/or time delay manipulator that communicate signals from input port of RF apparatus 16 to combiner 35. In the embodiment of RF apparatus 16 illustrated in FIG. 4, elevation steering device 34 is configured to phase shift, manipulate amplitude and/or time delay an input signal and communicate the altered or manipulated signal to a4 to 1 combiner 35. There are N signals which correspond to N ports of AAS apparatus 12. In this embodiment, azimuth steering devices 48 of channel emulator 18 are phase shifters, amplitude manipulators and/or time delay manipulators that are configured to alter or modify one or more combined signals received from combiner 35 where the number of azimuth steering devices 48 is less than the number of elevation steering devices 34. In one embodiment with AAS apparatus 12 having 64 ports and where RF apparatus 16 uses 4 to 1 combiners 35, 64 elevation steering devices 34 are used while 16 azimuth steering devices 48 are used. This embodiment of RF apparatus 16 and channel emulator 18 are discussed in detail below.

FIG. 5 is a block diagram of elevation steering devices 34 and azimuth steering devices 48 illustrated in FIG. 4 in accordance with the principles of the disclosure. In particular, in the left side of FIG. 5, combiner 35 is a4 to 1 combiner.

The incoming signals to each combiner 35 are weighted by a weighting vector $[c1, c2, c3, c4]$. The right-hand side of FIG. 5 depicts how the weighting factor $[c1, c2, c3, c4]$ and the outputs/output signals of the RF apparatus 16 $[g1, g2, \ldots g16]$, i.e., plurality of signals, are applied to the antenna array denoted by "Xs". Outputs $[g1, g2, \ldots g16]$ are connected to channel emulator 18. Channel emulator 18 will manipulate $[g1, g2, \ldots g16]$ to emulate channel geometry and fading. Using this arrangement, elevation steering is controlled by elevation steering devices 34, $[c1, c2, \ldots c4]$ which reside in the RF apparatus 16, while as azimuth steering is controlled by channel emulator 18 such as via azimuth steering devices 48. In one or more embodiments, respective steering corresponds to altering/manipulating at least one of phase, amplitude and time delay.

FIG. 6 is a block diagram of another embodiment of system 10 in accordance with the principles of the disclosure. In particular, RF apparatus 16 is configured to perform both the elevation steering process and the azimuth steering process described herein. Further, in one or more embodiments, elevation steering devices 34 are one or more of phase shifters, amplitude manipulators and/or time delay manipulators, as illustrated in FIG. 4, that receive a signal associated with a respective port of AAS apparatus 12.

FIG. 7 is another embodiment of RF apparatus 16 in accordance with the principles of the disclosure. RF apparatus 16 includes elevation modification module 50 that is configured to modify at least one elevation characteristic of the plurality of signals using a plurality of elevation steering devices 34, as described herein. RF apparatus 16 includes combining module 52 that is configured to combine the plurality of signals in order to output a plurality of combined signal using a plurality of combiners 35, as described herein. In one or more embodiments, each combiner 35 is configured to combine at least two signals of the plurality of signals. RF apparatus 16 includes azimuth modification module 54 that is configured to modify at least one azimuth characteristic of the plurality of combined signals using a plurality of azimuth steering devices 48, as described herein. In one or more embodiments, azimuth modification module 54 is omitted from RF apparatus 16 such as if the azimuth modification process is performed by channel emulator 18.

FIG. 8 is another embodiment of channel emulator 18 in accordance with the principles of the disclosure. Channel emulator 18 includes azimuth modification module 54 that is configured to modify at least one azimuth characteristic of the plurality of combined signals using a plurality of azimuth steering devices 48, as described herein.

According to one aspect of the disclosure, a system 49 for simulating (or emulating) a plurality of wireless communication channels is provided. The system 49 includes a plurality of elevation steering devices 34 configured to modify at least one elevation characteristic of a plurality of signals. The system 49 includes a plurality of combiners 35. Each combiner 35 is configured to combine at least two signals of the plurality of signals to output a combined signal. The plurality of combiners 35 output a plurality of combined signals. The system 49 includes a plurality of azimuth steering devices 48 configured to modify at least one azimuth characteristic of the plurality of combined signals. The plurality of elevation steering devices 34 and the plurality of azimuth steering devices 48 simulate the plurality of wireless communication channels.

According to one embodiment of this aspect, the plurality of elevation steering devices 34 are configured to manipulate at least one taken from a group of phase, amplitude and time delay. According to one embodiment of this aspect, the plurality of azimuth steering devices 48 are different from the plurality of elevation steering devices 34.

According to one embodiment of this aspect, the plurality of elevation steering devices 34 apply a weighting vector $[c1, c2, \ldots cN]$ to the plurality of signals, where N corresponds to a number of the plurality of elevation steering devices 34. According to one embodiment of this aspect, the plurality of azimuth steering devices 48 manipulate the phase, amplitude and time delay of the plurality of signals $[g1, g2, \ldots, gX]$, where X corresponds to a number of the plurality of elevation steering devices 34. According to one embodiment of this aspect, each combiner 35 is a 4 to 1 combiner 35. According to one embodiment of this aspect, the system 49 includes processing circuitry 26/40 configured to: control the plurality of elevation steering devices 34 and control the plurality of azimuth steering devices 48. According to one embodiment of this aspect, the plurality of signals are 64 signals.

According to another aspect of the disclosure, a method for simulating a plurality of wireless communication channels is provided. At least one elevation characteristic of a plurality of signals is modified using a plurality of elevation steering devices 34. The plurality of signals are combined to output a plurality of combined signal using a plurality of combiners 35. Each combiner 35 is configured to combine at least two signals of the plurality of signals. At least one azimuth characteristic of the plurality of combined signals is modified using a plurality of azimuth steering devices 48.

The plurality of elevation steering devices 34 and the plurality of azimuth steering devices 48 simulate the plurality of wireless communication channels.

According to one embodiment of this aspect, the plurality of elevation steering devices 34 are configured to manipulate at least one taken from a group of phase, amplitude and time delay. According to one embodiment of this aspect, the plurality of azimuth steering devices 48 are a second plurality of phase shifters different from the plurality of elevation steering devices 34. According to one embodiment of this aspect, the plurality of elevation steering devices 34 apply a weighting vector [c1, c2, . . . cN] to the plurality of signals, where N corresponds to a number of the plurality of elevation steering devices 34.

According to one embodiment of this aspect, the plurality of azimuth steering devices 48 manipulate the phase, amplitude and time delay of the plurality of signals [g1, g2, . . . , gX], where X corresponds to a number of the plurality of elevation steering devices 34. According to one embodiment of this aspect, each combiner is a 4 to 1 combiner 35.

According to one embodiment of this aspect, the plurality of elevation steering devices 34 are controlled. The plurality of azimuth steering devices 48 are controlled. According to one embodiment of this aspect, the plurality of signals are 64 signals.

According to another aspect of the disclosure, a system 49 for simulating (or emulating) a plurality of wireless communication channels is provided. The system 49 includes a radio frequency, RF, apparatus 16, including: a plurality of elevation steering devices 34 configured to modify at least one elevation characteristic of a plurality of signals and a plurality of combiners 35. Each combiner 35 is configured to combine at least two signals of the plurality of signals to output a combined signal. The plurality of combiners output a plurality of combined signals. The system 49 includes a channel emulator 18 including: a plurality of azimuth steering devices 48 configured to modify at least one azimuth characteristic of the plurality of combined signals. The plurality of elevation steering devices 34 and the plurality of azimuth steering devices 48 simulate (or emulate) the plurality of wireless communication channels.

According to another aspect of the disclosure, a radio frequency, RF, apparatus 16 for simulating (or emulating) a plurality of wireless communication channels is provided. The RF apparatus 16 includes a plurality of elevation steering devices 34 configured to modify at least one elevation characteristic of a plurality of signals and a plurality of combiners 35. Each combiner 35 is configured to combine at least two signals of the plurality of signals to output a combined signal. The plurality of combiners 35 outputs a plurality of combined signals. The RF apparatus 16 includes a plurality of azimuth steering devices 48 configured to modify at least one azimuth characteristic of the plurality of combined signals. The plurality of elevation steering devices 34 and the plurality of azimuth steering devices 48 simulate (or emulate) the plurality of wireless communication channels.

According to one aspect of the disclosure, a system 49 for simulating (or emulating) a plurality of wireless communication channels is provided. The system 49 includes a radio frequency, RF, apparatus 16 including: an elevation modification module 50 configured to modify at least one elevation characteristic of a plurality of signals, and a combining module configured to combining the plurality of signals to output a plurality of combined signal. The system 49 includes a channel emulator 18 in communication with the RF apparatus 16, the channel emulator 18 including: an azimuth modification module 54 configured to modify at least one azimuth characteristic of the plurality of combined signals. The elevation modification module 50 and the azimuth modification module 54 simulates (or emulates) the plurality of wireless communication channels.

According to another aspect of the disclosure, a system 49 for simulating (or emulating) a plurality of wireless communication channels is provided. The system 49 includes a radio frequency, RF, apparatus including: elevation modification module 50 configured to modify at least one elevation characteristic of a plurality of signals, combining module 52 configured to combine the plurality of signals to output a plurality of combined signal, and an azimuth modification module 54 configured to modify at least one azimuth characteristic of the plurality of combined signals. The elevation modification module 50 and the azimuth modification module 54 simulate (or emulate) the plurality of wireless communication channels.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings which are limited only by the following claims.

What is claimed is:

1. A system for emulating a plurality of wireless communication channels, the system comprising:
   a plurality of elevation steering devices configured to modify at least one elevation characteristic of a plurality of signals and to manipulate at least one taken from a group of phase, amplitude and time delay, each elevation steering device of the plurality of elevation steering devices outputting an elevation steered signal;
   a plurality of combiners, each combiner configured to receive an elevation steered signal and to combine at least two elevation steered signals of the plurality of elevation steered signals to output a combined signal, the plurality of combiners outputting a plurality of combined signals;
   a plurality of azimuth steering devices configured to modify at least one azimuth characteristic of the plurality of modified combined signals, each azimuth steering device of the plurality of azimuth steering devices outputting an azimuth steered signal; and
   the plurality of elevation steering devices and the plurality of azimuth steering devices emulating the plurality of wireless communication channels.

2. The system of claim 1, wherein the plurality of azimuth steering devices are different from the plurality of elevation steering devices.

3. The system of claim 1, wherein the plurality of elevation steering devices apply a weighting vector [c1, c2, . . . cN] to the plurality of signals, where N corresponds to a number of the plurality of elevation steering devices.

4. The system of claim 1, wherein the plurality of azimuth steering devices manipulate phase, amplitude and time delay of the plurality of signals [g1, g2, . . . , gX], where X corresponds to a number of the plurality of elevation steering devices.

5. The system of claim 1, wherein each combiner is a 4 to 1 combiner.

6. The system of claim 1, further comprising processing circuitry configured to:
   control the plurality of elevation steering devices; and
   control the plurality of azimuth steering devices.

7. The system of claim 1, wherein the plurality of signals are 64 signals.

8. A method for emulating a plurality of wireless communication channels, the method comprising:
   modifying at least one elevation characteristic of a plurality of signals and manipulating at least one taken from a group of phase, amplitude and time delay using a plurality of elevation steering devices to produce a plurality of elevation steered signals;
   combining the plurality of elevation steered signals to output a plurality of combined signals using a plurality of combiners, each combiner configured to combine at least two signals of the plurality of signals to produce a modified combined signal;
   modifying at least one azimuth characteristic of the plurality of modified combined signals using a plurality of azimuth steering devices, each azimuth steering device of the plurality of azimuth steering device outputting an azimuth steered signal; and
   the plurality of elevation steering devices and the plurality of azimuth steering devices emulating the plurality of wireless communication channels.

9. The method of claim 8, wherein the plurality of azimuth steering devices include a second plurality of phase shifters different from the plurality of elevation steering devices.

10. The method of claim 8, wherein the plurality of elevation steering devices apply a weighting vector [c1, c2, . . . cN] to the plurality of signals, where N corresponds to a number of the plurality of elevation steering devices.

11. The method of claim 8, wherein the plurality of azimuth steering devices manipulate phase, amplitude and time delay of the plurality of signals [g1, g2, . . . , gX], where X corresponds to a number of the plurality of elevation steering devices.

12. The method of claim 8, wherein each combiner is a 4 to 1 combiner.

13. The method of claim 8, further comprising:
   controlling the plurality of elevation steering devices; and
   controlling the plurality of azimuth steering devices.

14. The method of claim 8, wherein the plurality of signals are 64 signals.

15. A system for emulating a plurality of wireless communication channels, the system comprising:
   a radio frequency, RF, apparatus, including:
      a plurality of elevation steering devices configured to modify at least one elevation characteristic of a plurality of signals and to manipulate at least one taken from a group of phase, amplitude and time delay, each elevation steering device of the plurality of elevation steering devices outputting an elevation steered signal;

a plurality of combiners, each combiner configured to receive an elevation steered signal and to combine at least two elevation steered signals of the plurality of elevation steered signals to output a combined signal, the plurality of combiners outputting a plurality of combined signals; and a channel emulator including:

a plurality of azimuth steering devices configured to modify at least one azimuth characteristic of the plurality of combined signals, each azimuth steering device of the plurality of azimuth steering devices outputting an azimuth steered signal, the plurality of elevation steering devices and the plurality of azimuth steering devices emulating the plurality of wireless communication channels.

16. The system of claim 15, wherein the plurality of elevation steering devices apply a weighting vector [$c_1, c_2, \ldots cN$] to the plurality of signals, where N corresponds to a number of the plurality of elevation steering devices.

17. The system of claim 15, wherein the plurality of azimuth steering devices manipulate phase, amplitude and time delay of the plurality of signals [$g_1, g_2, \ldots, gX$], where X corresponds to a number of the plurality of elevation steering devices.

18. The system of claim 15, wherein each combiner is a 4 to 1 combiner.

* * * * *